Dec. 3, 1940.   R. S. BYRNES   2,223,479
MACHINE FOR DIGGING AND CLEANING DITCHES
Filed Aug. 11, 1939   2 Sheets-Sheet 1
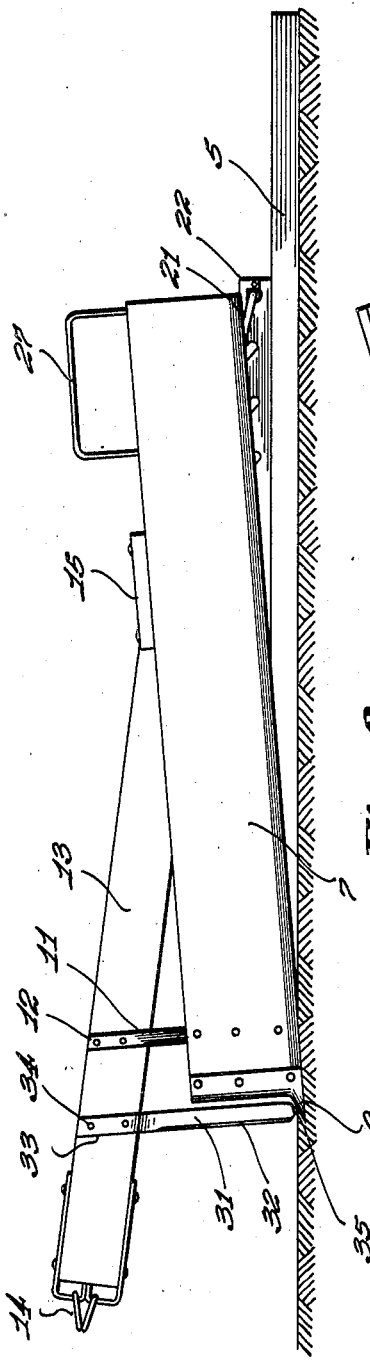
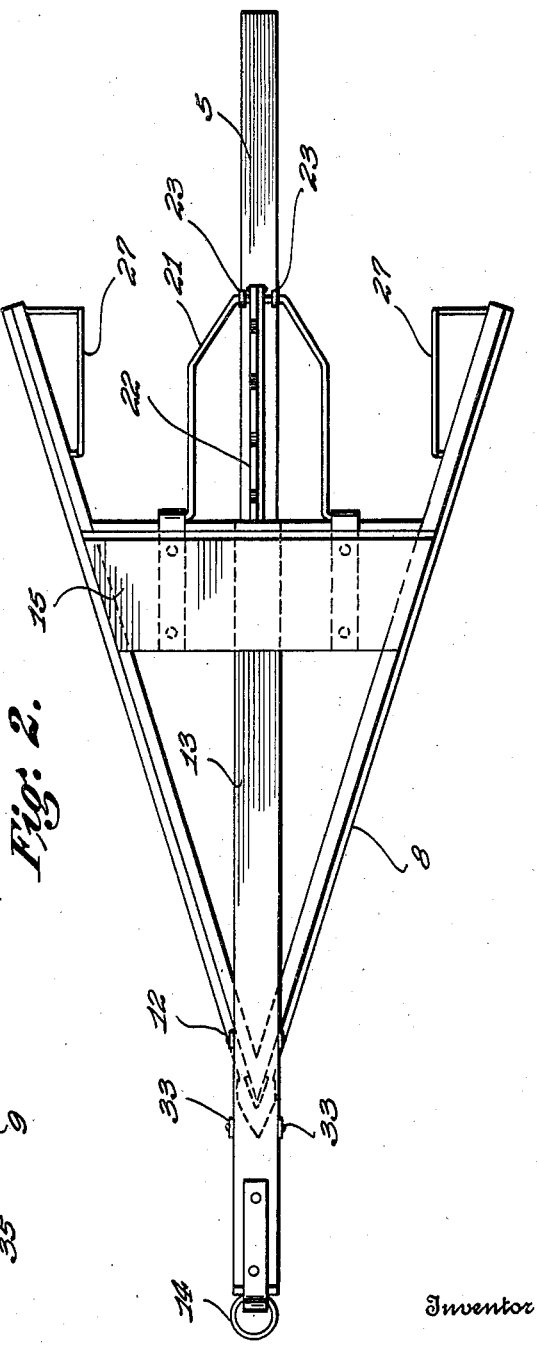
Inventor
Roy S. Byrnes
By Lacey & Lacey, Attorneys Dec. 3, 1940.  R. S. BYRNES  2,223,479
MACHINE FOR DIGGING AND CLEANING DITCHES
Filed Aug. 11, 1939   2 Sheets-Sheet 2
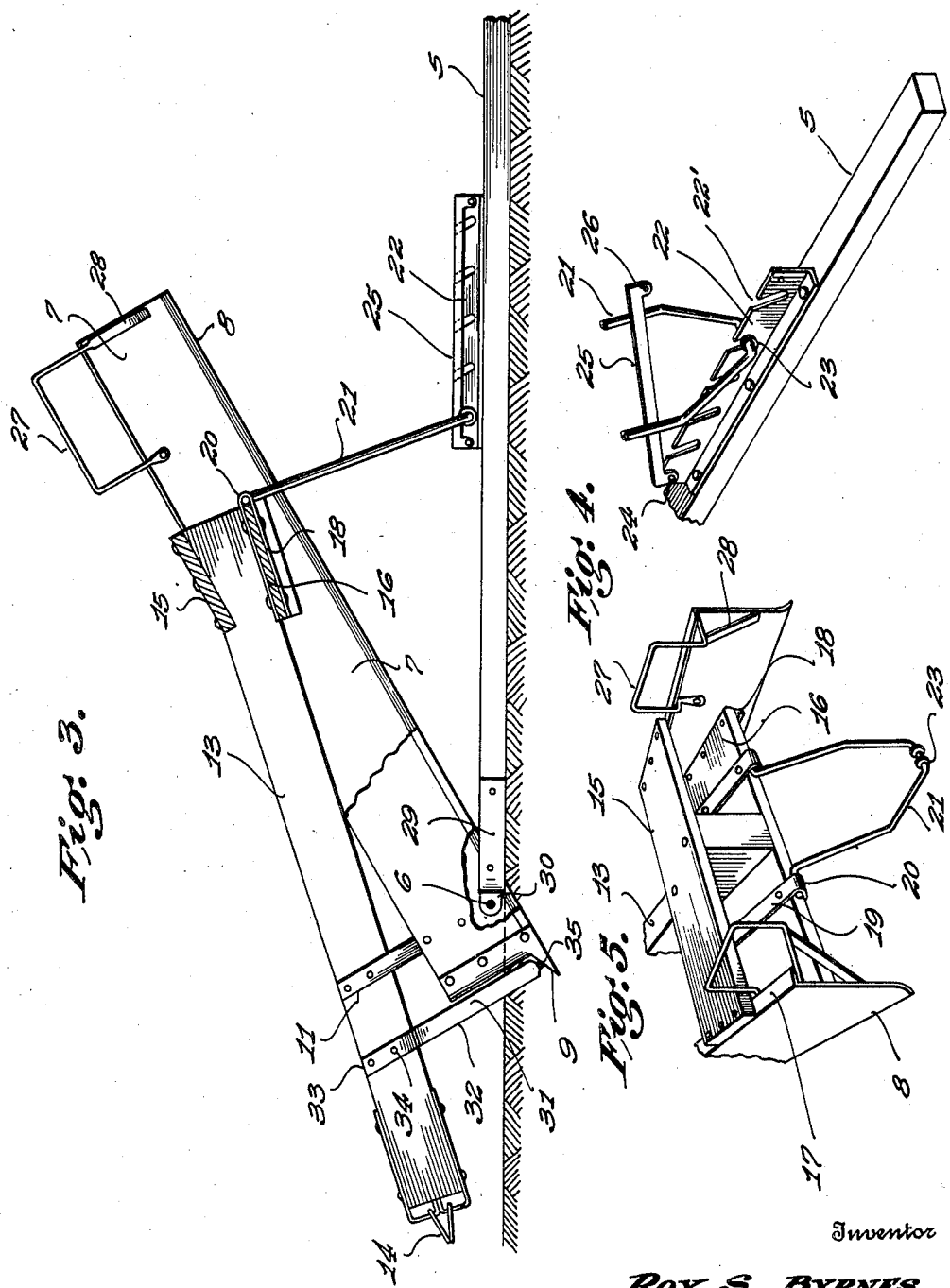
Inventor
ROY S. BYRNES
By Lacy & Lacy, Attorneys Patented Dec. 3, 1940

2,223,479

UNITED STATES PATENT OFFICE 2,223,479

MACHINE FOR DIGGING AND CLEANING DITCHES

Roy S. Byrnes, Hardin, Mont.

Application August 11, 1939, Serial No. 289,683

6 Claims. (Cl. 37—98)

This invention relates to ditching machines and more particularly to a machine for digging and cleaning ditches used for irrigation purposes.

The object of the invention is to provide a ditching machine of simple and durable construction, by means of which irrigating ditches that have become filled or partially filled with dirt, weeds and other growing vegetation may be thoroughly cleaned or deepened and the soil banked on opposite sides of the ditch to reinforce the walls thereof at one operation of the machine and without danger of clogging or otherwise interfering with the proper functioning of said machine.

A further object of the invention is to provide a combined digging and cleaning machine comprising a longitudinally disposed runner having a frame pivotally mounted thereon and provided with a terminal plow share and diverging cutting blades, said frame being adjustable at different angles with respect to the runner to vary the depth of penetration of the plow share into the soil.

A further object is to provide means for raising and lowering the frame and means for holding said frame in any desired position of adjustment.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a side elevation of a combined ditching and cleaning machine embodying the present invention, Figure 2 is a top plan view, Figure 3 is a side elevation, partly in section, showing the manner of adjusting the frame vertically with respect to the runner, Figure 4 is a detail perspective view of the rack bar for holding the pivoted frame in adjusted position, and Figure 5 is a detail perspective view of the rear portion of the pivoted frame and its associated parts.

The combined ditching and cleaning machine forming the subject-matter of the present invention comprises a longitudinally disposed runner 5 to which is pivotally connected, at 6, a substantially triangular shaped frame 7. The frame 7 is preferably formed of angle iron, and the lower edges of the diverging side walls of said frame are bent laterally to form cutting edges 8 for removing weeds and other growing vegetation in a ditch as the machine is drawn over the soil at the bottom of said ditch. Mounted at the forward end of the frame 7 is an earth-engaging element preferably in the form of a plow share 9, the point of which is adapted to enter the soil for the purpose of digging a ditch or deepening said ditch. Secured to the side walls of the frame in spaced relation to the plow share 9 are spaced uprights 11, and fitting between said uprights and secured thereto by bolts or similar fastening devices 12 is a beam 13 having its forward end provided with a clevis or hitch 14 for attachment to a draft animal, tractor or other source of power.

Secured to the rear end of the beam 13 are upper and lower transverse bars 15 and 16, the opposite ends of the upper bar 15 being bolted or otherwise rigidly secured to inwardly extending flanges 17 of the side walls of the frame 7, while the opposite ends of the lower bar 16 rest on inclined brackets or flanges 18 projecting inwardly from the side walls of the triangular frame, as shown. Secured to the lower bar 16 are strap irons 19 having their forward ends spaced from the adjacent edge of the bar 16 to form terminal eyes 20 in which is pivotally mounted for swinging movement a loop or yoke 21 adapted to engage a rack bar 22 mounted on the runner 5 for the purpose of adjusting the triangular frame vertically with respect to said runner. The rack bar 22 is provided with a series of notches 22' opening through the upper edge thereof and adapted to receive the closed end of the loop 21, said loop being provided at its closed end with spaced stops 23 which engage the opposite faces of the rack bar 21 and serve to prevent lateral movement of the loop with respect to said rack bar. Pivotally mounted at 24 on one end of the rack bar 21 is a locking member or bar 25 which serves to hold the closed end of the loop 21 within a selected notch 22' of the rack bar. The free end of the locking bar 25 is provided with an opening 26 which registers with a corresponding opening 27 formed in said rack bar so as to permit the insertion of a pin or other fastening device for holding the rack bar in lowered or closed position.

As a means for manually raising and lowering the triangular supporting frame 7, there are provided upstanding loops or handles 27 extending inwardly from the side members of the frame at the rear of the transverse bars 15 and 16. The handles 27 are offset with respect to the diverging side walls of the frame 7 and are secured thereto by downwardly inclined braces 28. The pivot pin 6 extends transversely of the triangular frame in spaced relation to the plow share 9 and the forward end of the runner 5 is provided with spaced strap irons 29 terminating in a perforated lug 30 adapted to receive the pivot pin 6, as best shown in Figure 3.

Mounted on the front end of the machine is a colter 31 preferably formed from a flat bar of metal having its forward vertical edge sharpened at 32 and its upper end forked at 33 to receive the beam 13 and to which it is rigidly secured by bolts or similar fastening devices 34. The lower end of the bar is provided with a threaded terminal 35 which extends through an opening in the plow share for engagement with a suitable clamping nut. The flat metal bar not only acts as a colter but also as a vertical brace between the lower portion of the plow share and the plow beam.

When cleaning and deepening a ditch, the triangular supporting frame 7 is adjusted at the proper angle with respect to the runner by inserting the closed end of the loop 21 in a selected notch in the rack bar 22 and holding the loop against displacement by means of the locking bar 25. As the machine is drawn over the bottom of the ditch, the plow share 9 will dig into the soil while the cutting edges 8 of the triangular frame will cut and effectually remove weeds and other growing vegetation in the ditch and at the same time the diverging side walls of the frame will force the soil laterally so as to form a bank or dike on each side of the ditch and prevent the loss of water from the ditch when said ditch is used for irrigation purposes, as will be readily understood. If it is desired to dig a new ditch or to materially deepen an old ditch, the loop 25 is moved into engagement with one of the forward notches of the rack bar and in which position the frame 7 will be supported at a sharp angle to the runner so as to cause the plow share 9 to penetrate the soil to the desired depth, as shown in Figure 3 of the drawings. By adjusting the loop 21 longitudinally of the rack bar the depth of penetration of the plow share 21 may be regulated at will according to the nature of the work to be performed. It will thus be seen that there is provided a durable and thoroughly practical machine which will simultaneously cut and remove weeds and growing vegetation in an irrigation ditch and bank the soil on the opposite sides of the ditch, thereby materially decreasing the time necessary to perform such work and consequently effecting a material saving in the cost of said work.

It will, of course, be understood that the machines may be made in different sizes and shapes and constructed of any suitable material without departing from the spirit of the invention.

Having thus described the invention, what is claimed as new is:

1. A machine of the class described comprising a longitudinally disposed runner, a substantially triangular shaped frame pivotally connected with the runner and having its diverging side walls provided with cutting edges, a plow share secured to the apex of the frame, a draft beam secured to said frame, a rack bar mounted on the runner, and a yoke pivotally mounted on the frame and adapted to engage the rack bar for holding the frame in different positions of adjustment with respect to the runner.

2. A machine of the class described comprising a longitudinally disposed runner, a substantially triangular shaped frame pivotally mounted on the forward end of the runner, a earth-engaging device secured to the apex of the frame, a draft beam mounted on the frame, supports secured to the inner face of the frame, spaced transverse bars secured to the inner end of the draft beam and engaging the upper edge of the frame and said supports respectively, a yoke pivotally mounted on one of the transverse bars, a rack bar secured to the runner and adapted to receive the closed end of the yoke, and a locking bar carried by the rack bar for holding the yoke in engagement with said rack bar.

3. A machine of the class described comprising a longitudinally disposed runner, a substantially triangular shaped frame pivotally mounted for tilting movement on the forward end of the runner, said frame being provided with lateral cutting edges, and a terminal earth-engaging device, a draft beam secured to the frame, spaced transverse bars secured to the upper and lower faces of the draft beam at the rear end thereof and secured to said frame, eyes mounted on one of the transverse bars, a loop pivotally mounted in the eyes, a bar secured to the runner and provided with spaced notches adapted to receive the loop, stops carried by the free end of the loop for engagement with opposite side faces of the notched bar on the runner, and a locking device mounted on the notched bar for holding the loop in a selected notch on said bar.

4. A machine of the class described comprising a longitudinally disposed runner, a substantially triangular shaped frame pivotally connected with the forward end of the runner and provided with lateral cutting edges, a plow share mounted on the apex of the frame, spaced uprights extending vertically from the frame, a draft bar fitted between said uprights and rigidly secured thereto, spaced transverse bars carried by the rear end of the draft beam and engaging the frame, a rack bar mounted on the runner, a loop pivotally mounted on one of the spaced transverse bars and adapted to engage the rack bar for holding the frame in different positions of angular adjustment with respect to the runner, and upstanding hand loops secured to the rear end of the frame for raising and lowering the latter.

5. A machine of the class described comprising a substantially triangular shaped frame having the lower edges of its diverging side walls extended laterally to form cutting edges, a plow share secured to the apex of the frame, a pivot pin connecting the diverging walls of the frame and arranged back of the plow share, a longitudinally disposed runner, a strap iron secured to the forward end of the runner and provided with a perforated lug adapted to receive the pivot pin, inclined supporting flanges secured to the inner faces of the diverging side walls of the frame, an upper transverse bar secured to the rear end of the draft beam and secured to the top of the frame, a lower transverse bar secured to said draft beam and resting on the inclined flanges, strap irons secured to said lower transverse bar and provided with terminal eyes, a rack bar mounted on the runner, a loop pivotally mounted in said eyes and adapted to engage the rack bar for holding the frame in different positions of adjustment with respect to the runner, means for locking the loop in engagement with the rack bar, and hand loops secured to the inner faces of the side walls of the frame at the rear of said transverse bars.

6. A machine of the class described comprising a substantially triangular shaped frame formed of angle iron, the upper edges of the side walls of the frame being provided with inwardly extending flanges and the lower longitudinal edge thereof bent laterally to form cutting edges, an earth-engaging device secured to the apex of the frame, a pivot pin extending transversely of the frame immediately in the rear of the earth-engaging device, a longitudinally disposed runner pivotally mounted on said pin, a draft beam, an upper transverse bar secured to the rear end of the draft beam and the inwardly extending flanges of the frame respectively, supporting flanges projecting inwardly of the frame, a lower transverse bar resting on the supporting flanges, a rack bar carried by the runner and provided with an opening, a loop pivotally mounted on the lower transverse bar and adapted to engage the rack bar, said loop being provided with spaced stops for centering the loop on the rack bar, a locking bar pivotally mounted on one end of the rack bar and provided with an opening adapted to register with the opening in the rack bar to permit the insertion of a fastening device, and hand loops mounted on the rear end of the frame and provided with inclined braces secured to said frame.

ROY S. BYRNES.